April 13, 1948.
C. PAULSON
2,439,527
WAVE METER
Filed Sept. 22, 1944
4 Sheets-Sheet 1
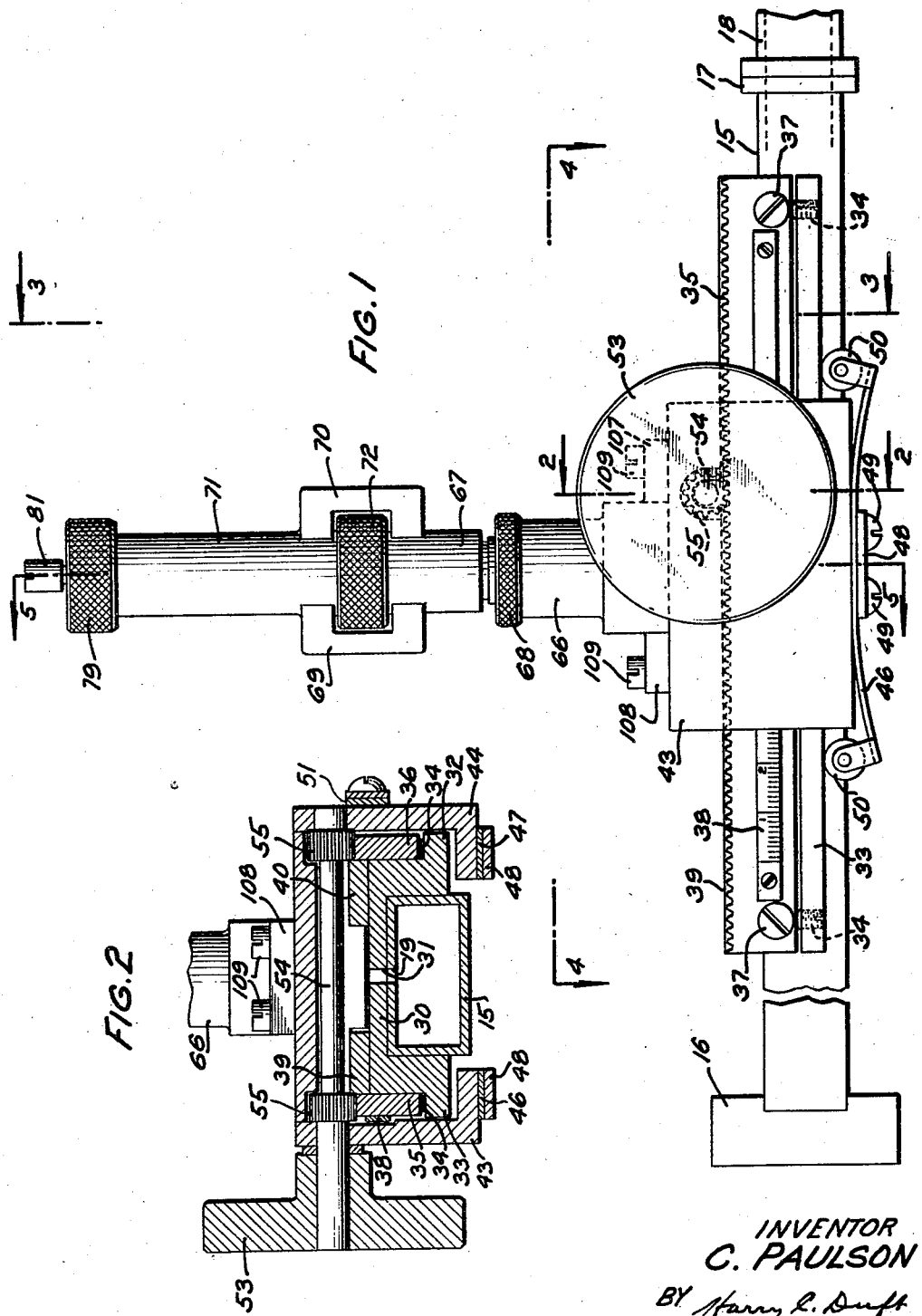
INVENTOR
C. PAULSON
BY Harry R. Duft
ATTORNEY

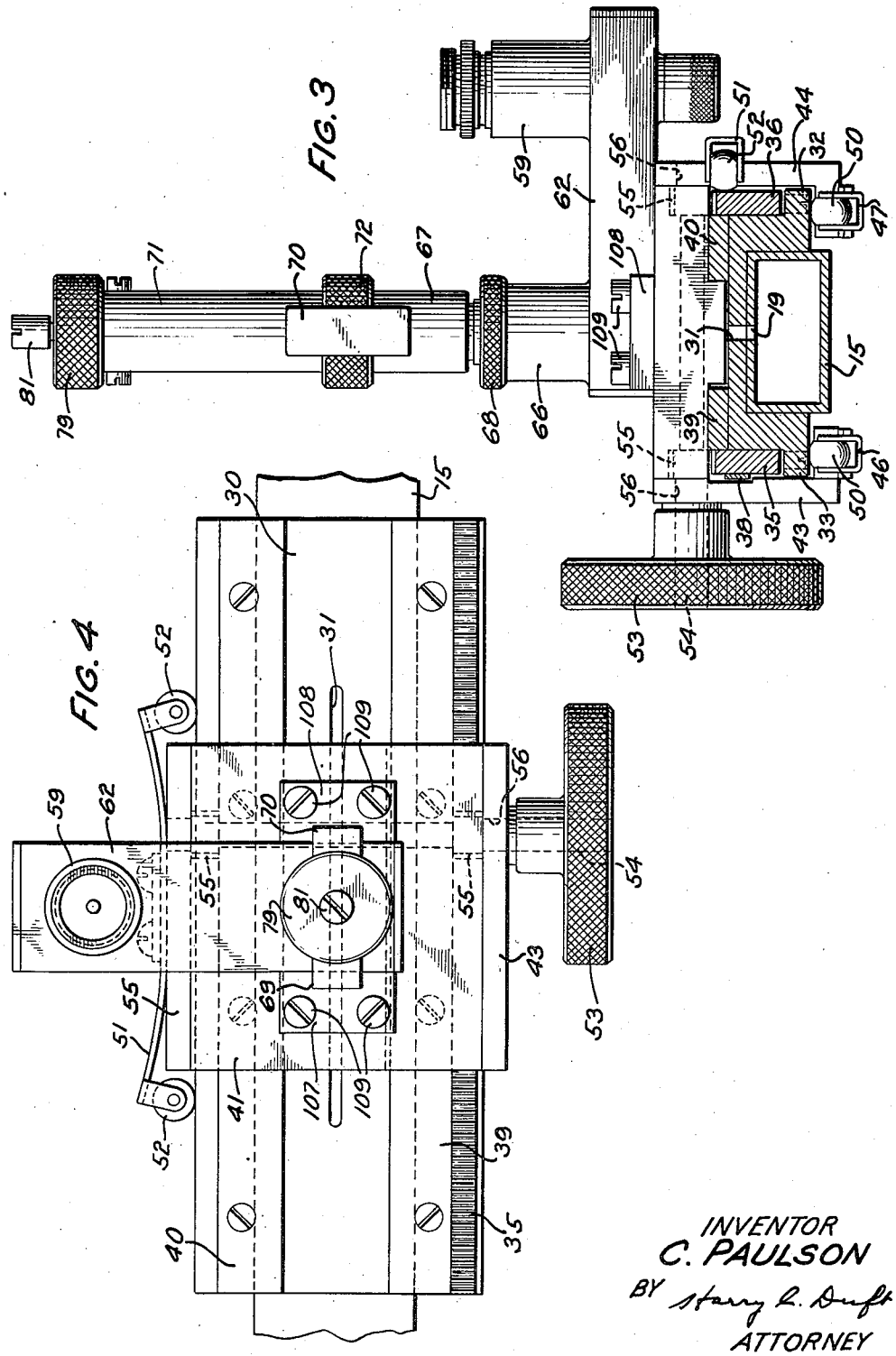

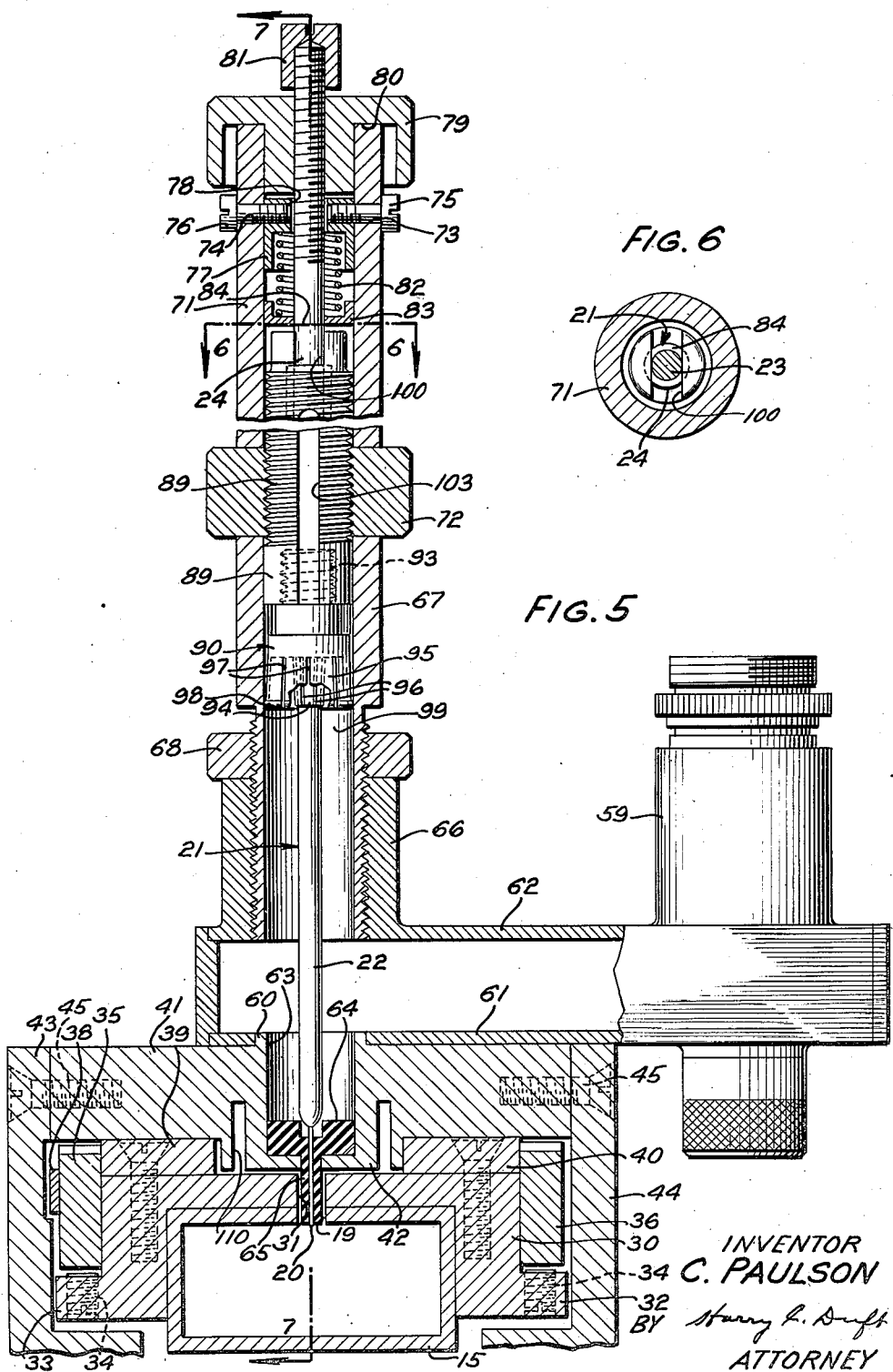

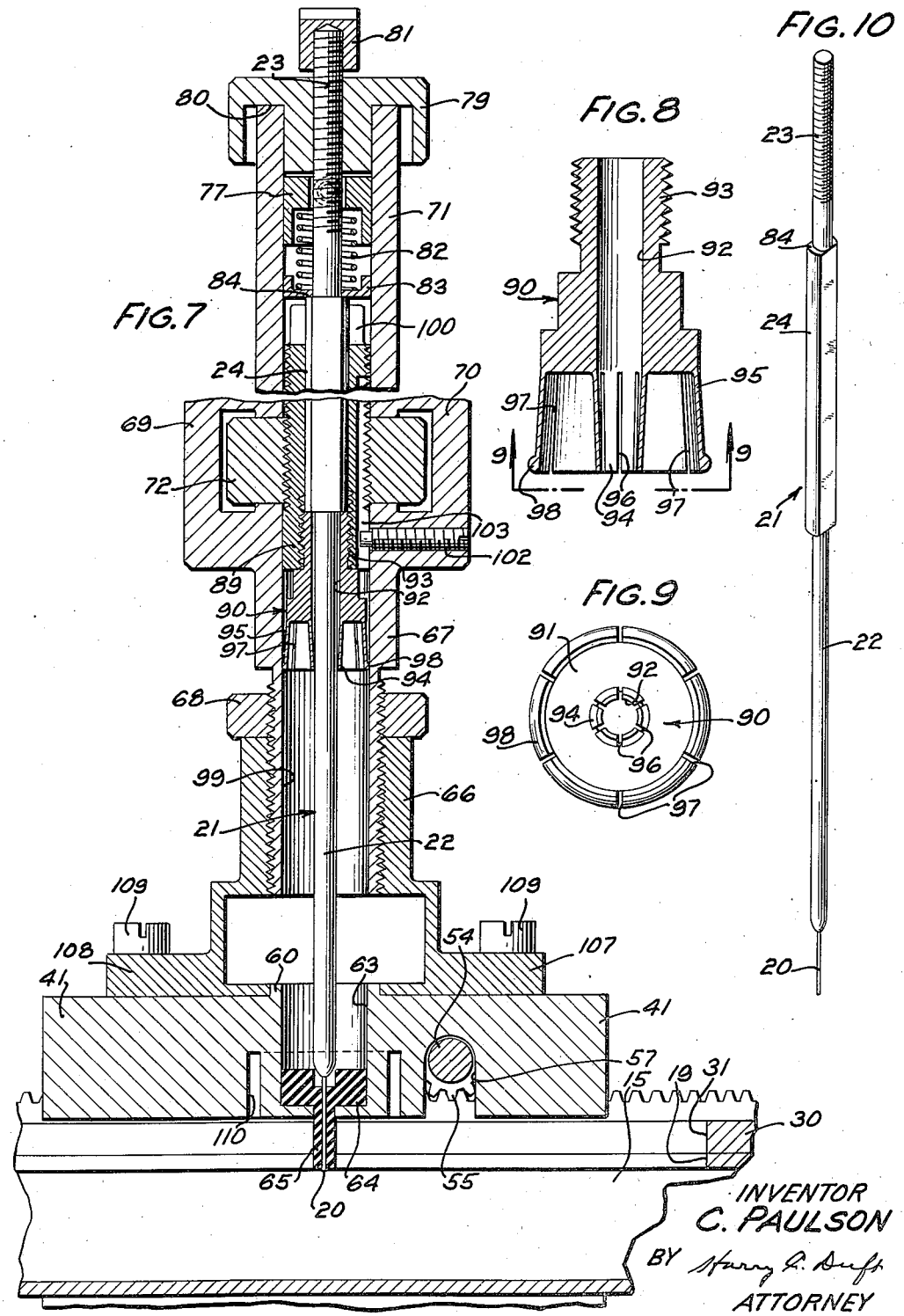

Patented Apr. 13, 1948

2,439,527

UNITED STATES PATENT OFFICE 2,439,527

WAVEMETER

Christian Paulson, Elmhurst, Ill., assignor to Western Electric Company, Incorporated, New York, N. Y., a corporation of New York Application September 22, 1944, Serial No. 555,240

6 Claims. (Cl. 178—44)

This invention relates to a wave meter, and more particularly to a standing wave detector for radar equipment.

It is an object of the present invention to provide a simple, accurate, and efficient wave meter.

In accordance with one embodiment of the invention a section of a wave guide, which may be connected between a generator, generating a high frequency current of a predetermined frequency, and a load, has a slidable carriage mounted thereon carrying an adjustable probe in a slot in a section of a wave guide. The carriage is mounted for movement on ground rails having guide surfaces at right angles to each other and the carriage is equipped with means for resiliently urging it against the ground surfaces to maintain the probe carried by the carriage in a rectilinear path during movement of the carriage along the section of wave guide. The carriage also carries detecting means, means whereby the penetration of the probe into the section of wave guide may be adjusted with a high degree of accuracy, and a tuning device coaxially mounted with respect to the probe for tuning the section of wave guide.

A complete understanding of the invention may be had by reference to the following detailed description when considered in conjunction with the accompanying drawings, wherein Fig. 1 is a front elevational view of a wave meter made in accordance with the present invention and showing coupling means whereby the wave meter may be connected between a generator and a load;

Fig. 2 is a fragmentary transverse vertical sectional view taken substantially along the line 2—2 of Fig. 1 in the direction of the arrows;

Fig. 3 is a transverse sectional view taken substantially along the line 3—3 of Fig. 1 in the direction of the arrows and showing the tuning means for the meter in elevation;

Fig. 4 is a fragmentary plan view of the wave meter shown in Fig. 1;

Fig. 5 is a vertical sectional view taken along the line 5—5 in Fig. 1 in the direction of the arrows and showing details of construction of the tuning mechanism and probe adjusting means on an enlarged scale;

Fig. 6 is a horizontal detail sectional view taken substantially along the line 6—6 of Fig. 5 in the direction of the arrows;

Fig. 7 is a vertical sectional view taken at right angles to Fig. 5 and in the direction of the arrows along the line 7—7 of Fig. 5;

Figs. 8 and 9 are detail views on an enlarged scale of a portion of the tuning means for tuning the wave meter, Fig. 8 being an enlarged sectional view along the same plane as Fig. 7, and Fig. 9 being a bottom view looking upwardly at the bottom of Fig. 8 in the direction of the arrows along the line 9—9, and Fig. 10 is a detail view in perspective of the probe on a slightly enlarged scale.

Referring to the drawings, wherein like reference numerals designate the same parts throughout the several views, it will be seen that a section of wave guide 15 is provided, which comprises a base on which the wave meter may be mounted and also constitutes a part of the meter itself. This section of a wave guide is provided with a coupling 16 at its left end, as viewed in Fig. 1, whereby the meter may be connected or coupled to a high frequency generator, such, for example, as a magnetron tube, and at its right end is provided with a coupling 17, whereby the meter may be connected to a load illustrated by the section wave guide 18. As may be seen most clearly in Figs. 2, 3, 4, 5 and 7, the section of wave guide 15 is provided with a slot 19 into which the end of a probe point 20 extends. The probe point 20 comprises the end of a probe 21 illustrated most clearly in Fig. 10. This probe includes, in addition to the point 20, a shank portion 22, a threaded upper shank 23, and a flattened body portion 24.

Fixed to the section of wave guide 15 in any suitable manner is a base block 30 having a slot 31 therein, which coincides with the slot 19. The block 30, as shown most clearly in Figs. 2 and 5, is provided with flanges 32 and 33 adjacent its base, into which adjustment screws 34—34 are threaded for adjustably positioning a pair of racks 35 and 36. After their adjustment the racks may be fixed to the base block 30 by means of machine screws 37—37. The rack 35 also carries a scale 38, the purpose of which will become apparent as the description progresses.

In addition to supporting the racks 35, the base block 30 carries a pair of ground rails 39 and 40, the upper surfaces of which are ground to the highest possible degree of parallelism with the horizontally disposed surfaces of the wave guide section 15. In addition to the upper surfaces of the rails 39 being ground parallel to the horizontal surfaces of wave guide section 15, the vertical surface of rail 40, which is disposed adjacent the center of the wave guide section 15, is also ground to a high degree of precision so that a carriage block 41 having its undersurfaces ground or lapped to ride on the upper surfaces of the rails 39 and 40 will be carried by the rails in a path as nearly parallel to the wave guide section 15 as is possible. The carriage block 41 has a downwardly extending projection 42, the right side (Figs. 3 and 5) of which bears against the left or ground surface of the rail 40. The base of the downwardly extending projection 42 is ground away slightly so as not to engage the upper surface of the base block 30, whereby the carriage block will ride on and contact only the rails 39 and 40.

Extending along the length of the carriage block 41 are a pair of substantially L-shaped plates 43 and 44, which are suitably attached to the carriage block 41, for example, by means of machine screws 45—45. The lower portions of the plates 43 and 44 extend under the flanges 33 and 32, respectively, and have fixed to them leaf springs 46 and 47, held in place on the bottom horizontally extending portions of the plates 43 and 44 by means of retainer plates 48—48 and round head machine screws 49—49. As may be seen most clearly in Fig. 1, the leaf spring 46 is bent at its outer ends, which extend beyond the ends of the plate 43, to receiver rollers 50—50, which are journalled for free rotation in the ends of the spring 46. The construction of the spring 47 and the means for retaining it on the bottom horizontally extending portion of the plate 44 are exactly the same as those provided for the spring 46. The spring 46 and spring 47 are biased to urge the carriage block 41 downwardly into intimate engagement with the upper surfaces of the rails 39 and 40. At the rear of the apparatus, as seen most clearly in Figs. 3 and 4, a leaf spring 51, carrying rollers 52—52, is attached to the L-shaped plate 44 in position to urge the downwardly extending projection 42 of the carriage block 41 against the right hand, ground surface of the rail 40 (Fig. 5), thus to cause the carriage block to travel in a rectilinear path. The mechanism for moving the carriage block 41 and parts carried thereby comprises a knurled hand wheel 53 fixed to a shaft 54 on which are formed a pair of spur gears 55—55 meshing with the racks 35 and 36. The shaft 54 is mounted for free rotation in suitable bearing apertures 56—56 in the L-shaped plates 43 and 44 and extends through a clearance notch 57 in the carriage block 41.

On its upper surface the base block 30 is provided with an annular shoulder 60 (Fig. 5), which projects upwardly a distance equal to the thickness of a bottom wall 61 of a section of wave guide 62 positioned at right angles to the section of wave guide 15. The bottom wall 61 of the section of wave guide 62 has a circular aperture formed in it to receive the annular shoulder 60 and the section of wave guide 62 may be secured to the carriage block 41 by soldering or brazing it thereto along the line of abutment of the bottom wall of the section of wave guide with the carriage block 41. The annular shoulder 60 surrounds a shouldered aperture 63, which is adapted to receive a shouldered bushing 64, made of any suitable insulating material, for example, polystyrene, and provided with a hollow shank portion 65 adapted to slidably receive the probe point 20 and the probe 21.

Formed integrally with or welded to the section of wave guide 62 is an upwardly extending collar or tubular projection 66, which may be formed integrally with or welded onto the upper wall of the section of the wave guide 62. In addition to the collar 66, the section of wave guide 62 carries a crystal detector unit 59, the details of construction of which are not essential to the present invention and, therefore, will not be described in detail, it being sufficient to state herein that the crystal detector unit serves to control any suitable type of indicating mechanism, such as a meter, to indicate the value of the wave present in the section of wave guide 62.

Threaded into the collar 66 is a tubular tuning cavity member 67, which may be locked in position in the collar 66 by means of a knurled lock nut 68, and which has a pair of yokes 69 and 70 attached to it and to a second tubular member 71 to form a probe supporting assembly. The adjacent ends of the tubular members 67 and 71 are spaced apart a sufficient distance to serve as bearing surfaces against which a knurled tuning nut 72 will bear. Adjacent the upper end of the tubular member 71 a pair of diametrically opposed apertures 73 and 74 are provided for receiving machine screws 75 and 76, respectively, which are threaded into a cup-shaped spring retainer 77 having a central aperture 78 formed in it for receiving the threaded upper shank 23 of the probe 21. The probe 21 is threaded into a probe retracting member 79, which has an annular groove 80 formed in it for receiving the upper end of the tubular member 71. By manipulating the probe retracting member 79, the probe may be advanced or retracted with respect to the tube 71 to cause its point 20 to extend a greater or less amount into the section of wave guide 15. The amount which the probe may be advanced into the section of the wave guide 15 is limited by a probe stop nut 81 threaded onto the end of the threaded upper shank 23 of the probe 21. The probe is normally urged downwardly by a compression spring 82, which bears against the spring retainer 77 and engages a cup-shaped washer 83, which rests on a shoulder 84 at the juncture of the threaded upper shank 23 and flattened body portion 24 of the probe.

Threadedly engaging the tuning nut 72 are the external threads of an externally and internally threaded tuning shaft 89 carrying a coaxial tuner contactor, designated generally by the numeral 90. The tuner contactor comprises, as shown most clearly in Fig. 8, a body portion 91 having a central aperture 92 extending therethrough, through which the body portion 24 of the probe 21 extends, and having a threaded shank portion 93 for threadedly engaging the internally formed threads of the tubular tuning shaft 89. The lower portion of the tuner contactor 90 is formed to have inner and outer conductor engaging portions 94 and 95 comprising coaxial tubular portions formed integrally with the body portion 91 and slotted as shown at 96—96 and 97—97, respectively. After the slots are formed in the conductor engaging portions 94 and 95, they may be bent inwardly and outwardly, respectively, so that the inner surfaces of the inner conductor engaging portion 94 will bear tightly against and slide on the shank 22 of the probe and so that a conducting rib 98 on the outer conductor engaging portion 95 will bear against the inner surface of the tubular member 67. Thus, upon manipulation of the tuning nut 72, the tubular coaxial tuner contactor 90 may be raised or lowered without disturbing the position of the probe 21 to vary the size of a tuning cavity 99 formed in the lower end of the tubular member 67 to tune the section of wave guide 62. To facilitate the assembly of the probe 21, tuner shaft 89, and tuner contactor 90, the upper end of the tuner shaft 89 has a slot 100 in it to receive a screw driver, whereby the tuner shaft may be removed from the tuning nut 72 after the tubular member 67 is removed from the collar 66.

The slot 100, which is somewhat narrower than the inside diameter of the tuning shaft 89, slidably receives the flattened body portion 24 of the probe 21 and prevents rotation of the probe with respect to the tuning shaft while permitting its reciprocation. Rotation of the tuning shaft 89 is prevented by a set screw 102, the tip of which enters a slot 103 in the tuning shaft 89 and which is threaded into the yoke 70. In this manner, the tuning shaft and probe are both prevented from rotating and may be reciprocated by the tuning nut 72 and the probe retracting member 79, respectively. The manipulation of the tuning nut 72 will regulate the size of the tuning cavity 99 and thus tune the section of wave guide 62 to impress a signal on the crystal detector unit 59. Similarly, adjustment of the probe 21 will be effected to determine the distance that the probe point 20 extends into the section of wave guide 15 as the probe retracting member 79 is rotated to effect the adjustment of the probe 21.

As described hereinbefore, the section of wave guide 62 is soldered or brazed on the carriage block 41. However, in order to more rigidly attach the section of wave guide 62 and parts carried thereby on the upper surface of the carriage block 41, flanges 107 and 108 are provided on the section of wave guide 62, which may be secured to the block 41 by means of machine screws 109—109. The bottom surface of the carriage block 41 has an annular groove 110 cut into it to serve as a choke joint for preventing stray current from leaking from the wave guide 15 at the point where the downwardly extending projection 42 of the carriage block is adjacent to the top of the base block 39. This choke joint, as is usual in such cases, extends annularly, coaxially with the shouldered aperture 63 and probe point 20.

In the operation of the apparatus, a load, which may comprise a section of wave guide 18 connected to other radar apparatus, may be tested. In order to make this test, the load 18 may be connected to the standing wave detector, as illustrated in Fig. 1, and a generator may be coupled to the opposite end of the detector. With the generator generating a wave of a predetermined frequency, the degree of penetration of the probe into the wave guide section 15 may be adjusted by manipulating the probe retracting member 79 to adjust the probe to a position where it will most effectively perform its detecting operation. Thereupon, the cavity 99 may be tuned by adjusting the tuning contactor 90 in the cavity 99 to direct any standing wave which may occur in the section of wave guide 15 to the crystal detector unit 59. After these adjustments are made, the carriage block 41 may be moved bodily with respect to the base block 39 by the manipulation of the knurled hand wheel 53 and the spacing or frequency of the standing wave generated in the section of wave guide 15 may be determined by reading the relative positions of the carriage block 41 on the scale 38. During its movements under the influence of the knurled hand wheel 53, the carriage 41 will be maintained parallel to the section of wave guide 15 due to the fact that the spring pressed rollers 50 and 52 will hold the carriage block 41 in intimate engagement with the upper surfaces of the rails 39 and 40 and will hold the right hand surface of the downwardly extending projection 42 of the carriage block 41 against the left hand surface (Fig. 5) of the rail 40.

What is claimed is:

1. In a wave meter, a carriage mounted to move in a rectilinear path, a section of wave guide having a rectilinear cavity positioned parallel to said path, a tubular member defining a cylindrical tuning cavity carried by said carriage, a coaxial tuning contactor slidable in said cavity to tune the cavity, a probe coaxially mounted with respect to the tuning contactor and tuning cavity and extending into said section of wave guide, means for holding said tuning contactor from rotating with respect to the tubular member, means for reciprocating the contactor, means on said last mentioned means for holding the probe from rotating with respect to the contactor, and means for reciprocating the probe.

2. In a wave meter, a carriage mounted to move in a rectilinear path, a section of the wave guide having a rectilinear cavity positioned parallel to said path, a tubular member defining a cylindrical tuning cavity carried by said carriage, a coaxial tuning contactor slidable in said cavity to tune the cavity, a probe coaxially mounted with respect to the tuning contactor and tuning cavity and extending into said section of wave guide, means for holding said tuning contactor from rotating with respect to the tubular member, an internally threaded, externally knurled tuning nut for reciprocating the tuning contactor, means fixed to the tuning contactor for holding the probe from rotating with respect to the contactor, and means including a knurled probe retracting member threadedly engaging the probe to reciprocate it.

3. In a wave meter, a section of wave guide having a rectilinearly extending cavity provided with a slot, a base block fixed to said section of wave guide, racks mounted on said base block and adjustable to parallelism with said cavity, a pair of rails mounted on said base member and extending longitudinally with respect to said cavity, a carriage supported and guided by said rails, means for resiliently urging said carriage to engage said rails, and means cooperating with said racks for moving said carriage on the rails in a rectilinear path parallel to said cavity.

4. In a wave meter, a probe adjusting and cavity tuning assembly comprising a tubular member defining a tuning cavity, a second tubular member positioned in alignment with said first tubular member, a pair of yokes rigidly connecting the two tubular members, a tuning nut positioned for rotation between said tubular members within the yokes, a tubular tuning shaft threadedly engaging said tuning nut, means for holding said shaft from rotating, a tuning contactor carried by said tubular tuning shaft in said cavity, a probe extending through said shaft and contactor, cooperating means on said probe and tubular shaft for blocking rotation of the probe with respect to the shaft means threadedly engaging the probe for imparting reciprocation to the probe, means on the tuning contactor for slidably engaging the walls of said cavity, and cooperating means on the tuning contactor for slidably engaging the probe.

5. In a wave meter, a section of a wave guide having a rectilinearly extending cavity, a base block fixed to said section of wave guide, rails carried by said base block, a carriage supported by said rails for movement therealong and having surfaces at right angles one to another for engaging one of said rails, and resiliently supported rollers positioned at right angles one to another and mounted on the carriage to bear against the base member and hold the carriage in intimate engagement with the rails.

6. In a wave meter, a section of a wave guide having a rectilinear extending cavity, a base block fixed to said section of wave guide, rails carried by said base block, a carriage supported by said rails for movement therealong and having surfaces at right angles one to another for engaging one of said rails, and resiliently supported rollers positioned at right angles one to another and mounted on the carriage to bear against the base member and hold the carriage in intimate engagement with the rails, said last mentioned means including two sets of rollers for urging the carriage in one direction with respect to the rails and another set of rollers positioned to urge the carriage to engage another surface of one of said rails.

CHRISTIAN PAULSON.

REFERENCES CITED

The following references are of record in the file of this patent:

UNITED STATES PATENTS

| Number | Name | Date |
| --- | --- | --- |
| 1,952,379 | Lee | Mar. 27, 1934 |
| 2,106,713 | Bowen | Feb. 1, 1938 |
| 2,109,843 | Kassner | Mar. 1, 1938 |
| 2,191,271 | Carter | Feb. 20, 1940 |
| 2,407,267 | Ginzton | Sept. 10, 1946 |